CONRAD LOCHER, OF OROVILLE, CALIFORNIA.

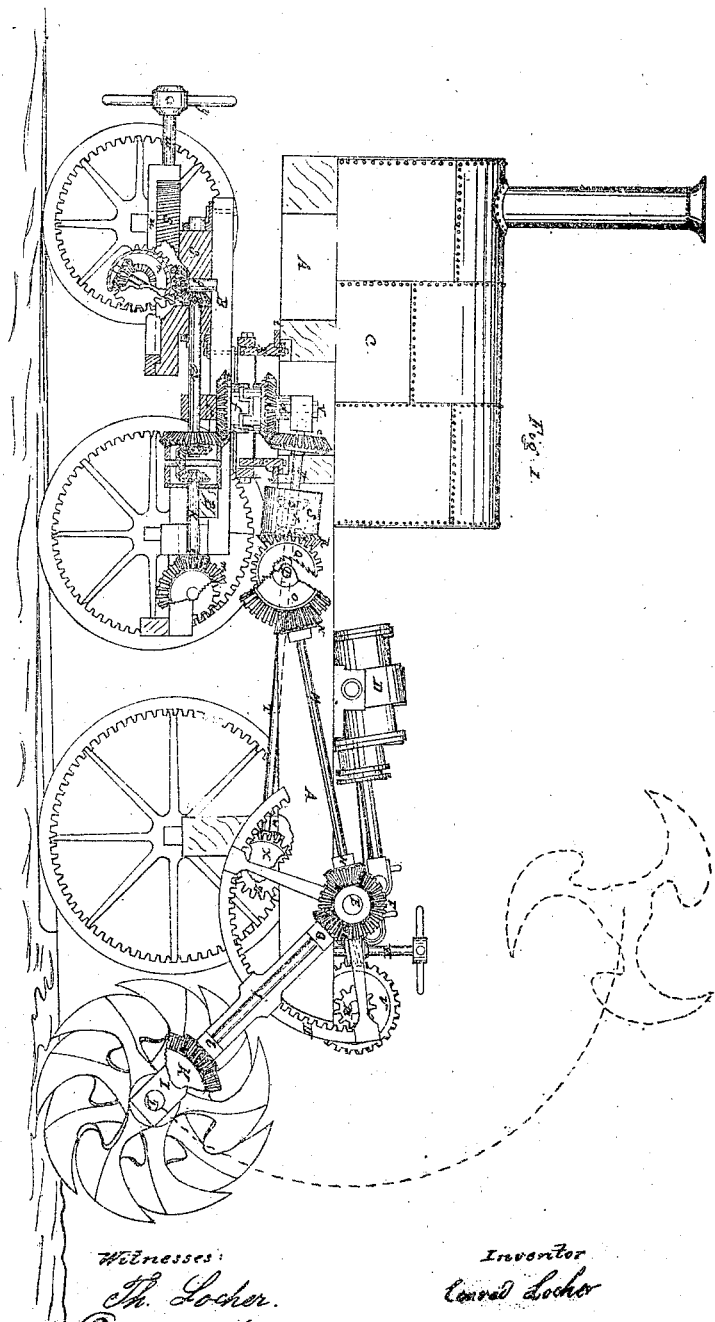

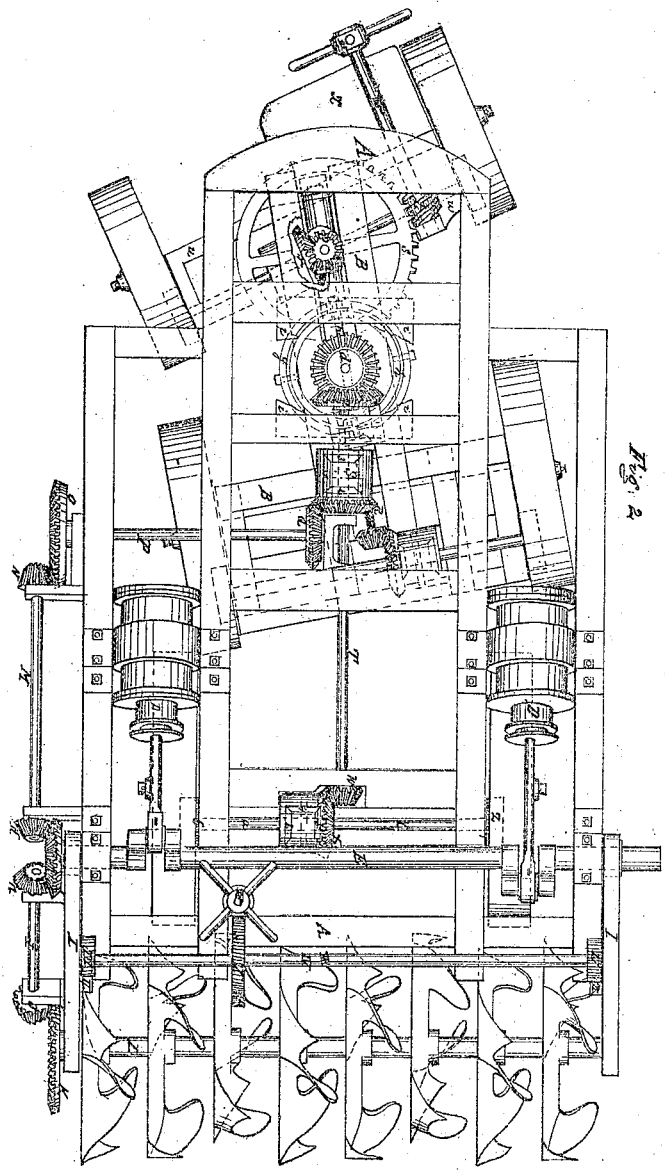

Letters Patent No. 82,963, dated October 13, 1868.

IMPROVEMENT IN AGRICULTURAL LOCOMOTIVE, WITH SPADING-APPARATUS.

The Schedule referred to in these Letters Patent and making part of the same.

*To all whom it may concern:*

Be it known that I, CONRAD LOCHER, of Oroville, in the county of Butte, and State of California, have invented a new and useful Agricultural Locomotive, with Spading-Apparatus attached; and I do hereby declare that the following is a full, clear, and exact description of the construction and operation of the same, reference being had to the annexed drawings, making a part of this specification, in which—

Figure I is a side view, with a portion of the frame broken away to show a vertical cut through the centre of an agricultural locomotive, with spading-apparatus attached, constructed according to my invention.

Figure II is a plan of the same, in the position of turning a curve.

The nature of my invention consists in constructing a wagon with four or more wheels, which are all driven by gears, so, in turning a curve, each one adopts the speed the curve requires, and the whole driven by steam-engines, and so arranged as to run over uneven ground and turn short curves; and in constructing a set of revolving spaders, with mould-board for turning the soil, attached to a horizontal shaft, in the form of a screw. They also receive their motion from the engines, and revolve in the same direction as the wheels of the wagon, so as to assist the locomotion, and taking a portion of the weight of the machine off the hind wheels when plowing.

To enable others skilled in the art to make and use my invention, I will proceed to describe its construction and operation.

Description.

A represents the upper platform, made of timber.
B, the middle platform.
C, the boiler.
D, the engines.
E, the main crank-shaft.
F is a conical gear on the main crank-shaft, driving pinion G and H. G communicates the power through shaft I to conical pinion J, which gears into the conical gear K, fastened to the spader-shaft L. Conical pinion H communicates the power, through shaft M, to conical pinion N, which gears into the conical wheel O fastened to shaft P, which runs to the middle of the wagon, and terminates in mitre-gear Q, driving its mate R, to which is fastened a box, S, (that turns loose on shaft T and U,) holding equalizing-gears composed of three bevel-gears, of which No. 1 turns on a pin fastened to the box S; No. 2 is fastened to shaft T, running towards the hind axle; No. 3 is fastened to shaft U, running towards the king-bolt V. Conical pinion W is fastened on shaft T, and gears into conical wheel X, which has a box attached holding equalizing-gears similar to the first, of which No. 4 turns on the pin fastened to the box; No. 5 is keyed to shaft Y, and pinion Z on its end gears into the inside gear of right hind wheel; No. 6 is keyed to shaft $a$, and its pinion $b$ gears into the inside gear of left hind wheel. Shaft U has a mitre-gear $c$ attached to its front end, driving its mate $d$ on king-bolt V. Mitre-gear $d$ has a clutch on its lower surface, catching into a similar clutch on the upper surface of mitre gear F, and turns on king-bolt $v$. King-bolt V is fastened to the upper frame, and $v$ to the middle frame. Outside of mitre-gears $d$ and F is a universal joint, $g$, which keeps the king-bolts V and $v$ concentric, and couples the upper and middle frame. Two pins of the universal joint are fastened to the middle frame, and the other two pins are fastened to the ring $h$ which turns in a box, $i$, in the upper frame. Mitre-gear $f$ drives its mate $j$, with its equalizing-box. Shaft $k$ runs towards the middle axle, and conical pinion $l$, on its end, gears into conical wheel $m$ with its equalizing-box, (similar to the one on the hind axle,) driving the middle wheels. Shaft $n$ runs towards the king-bolt of the front axle, and its mitre-pinion $o$ gears in its mate $p$ on the king-bolt $q$. $p$ is a double pinion, of which the lower one gears into conical wheel $r$, with its equalizing-box, (similar to the one on the hind axle,) driving the front wheels. Shaft $n$ runs through a box cast on the worm-wheel $s$, and is hinged to the middle frame, concentric with the shaft $n$. King-bolt $q$ comes up through the centre of the worm-wheel $s$. $t$ is a worm with its boxes on frame $u$, and gears in worm-wheel $s$. $w$ is the shaft of the worm, with hand-wheel $y$. $x$ is the platform for the pilot. The front axle is fastened on the frame $u$, forward of the king-bolt $q$, so as to make it turn a smaller curve. I I are two frames, one end of which carries the spading-apparatus, the other end being held concentric with the engine-shaft. II II are segments which gear into pinions III III on shaft IV. V is a worm-wheel on shaft IV. VI is a worm with shaft and hand-wheel to raise and lower the spaders with mould-boards.

The spaders have a pick-point and side-cutter resembling a plow, and the shape is such that their periphery does not crowd on the soil as the locomotive goes ahead. When not plowing, the spader-shaft L is raised by means of the worm VI, so as to bring the weight of the spaders over the hind axle.

The boiler and engines may be of any suitable form. The width of the wagon-tires will be proportioned to the weight of the locomotive, so as to run over soft ground. All the gears will be protected so that no sand can get into them.

Each spader will take a lump of soil about ten or twelve inches in width, twelve inches in length, and as deep as may be deemed proper, cut it off like a spade, raise and turn it like a plow, and drop it, thereby breaking it up. It has the same effect on a field as cross-plowing. The spaders will be made of any suitable material, composed of spider, spade, mould-board, and point, so they may be readily replaced if worn out.

The great advantage of this agricultural locomotive consists in the harmonizing combination of the whole. In plowing, only two of the spaders will enter the soil at the same moment, as the spaders are set in a screw-form. The power it requires to drive the spaders into the soil takes a portion of the weight (of the rear part) of the machine off the hind axle, whereby the wheels will not sink much into the soft soil. The periphery of the spaders is about double the speed of the wagon-wheels, but rotate in the same direction, thereby cutting backwards, and help to propel the machine. If the spaders strike a large boulder, they will lift the machine over it. The locomotive will plow like a right-hand plow. The spaders are left-hand, but as they cut backward, they do the work of a right-hand plow.

The locomotive may be used as a steam-wagon on turnpikes, as all the wheels are driven by the engines, or may be employed for driving threshing-machines, or saw-mills, or any other purpose. The engines will have clutches so as to detach the spading-apparatus or the gearing of the wagon.

I do not claim equalizing-gears, as they have been made before; but—

What I claim as my invention, and desire to secure by Letters Patent, is—

1. The application of equalizing gears between the axles of a wagon, so, in turning a curve, each wheel adopts the speed which the curve requires, and receives its propelling motion from the engines, by means of gearing or their equivalent.

2. The gearing and connection through the king-bolts.

3. The spaders, so constructed that they enter the soil like a pick, (nearly vertical,) cut off a slice like a spade, and turn it over like a plow.

4. Turning the spaders in the same direction as the wagon, thereby assisting locomotion.

5. The combination of the whole, in the way and manner herein set forth.

CONRAD LOCHER.

Witnesses:
THEOPHILUS LOCHER,
GEO. C. PERKINS.